L. J. LE PONTOIS.
SYSTEM AND METHOD OF GENERATING AND UTILIZING ELECTRIC CURRENTS FOR IGNITION AND BATTERY STORING PURPOSES.
APPLICATION FILED DEC. 7, 1910.

1,235,522.

Patented July 31, 1917.
11 SHEETS—SHEET 1.

Witnesses:
A. L. Lord,
Geo. B. Pitts

Inventor
Leon J. Le Pontois,
Edward R. Alexander
Attorney.

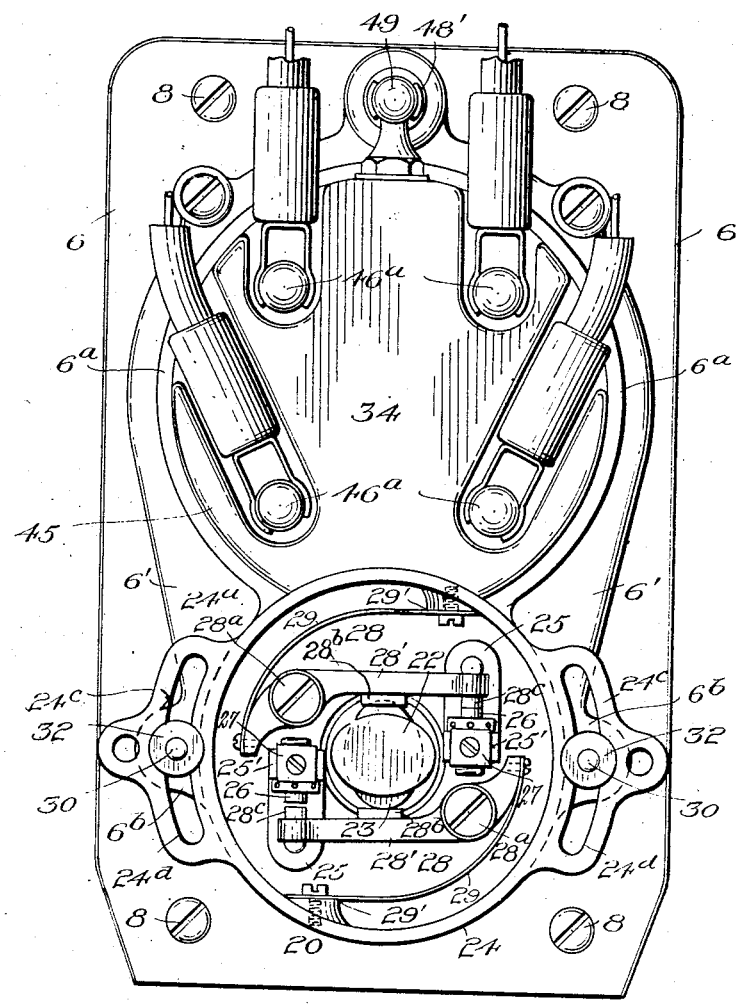

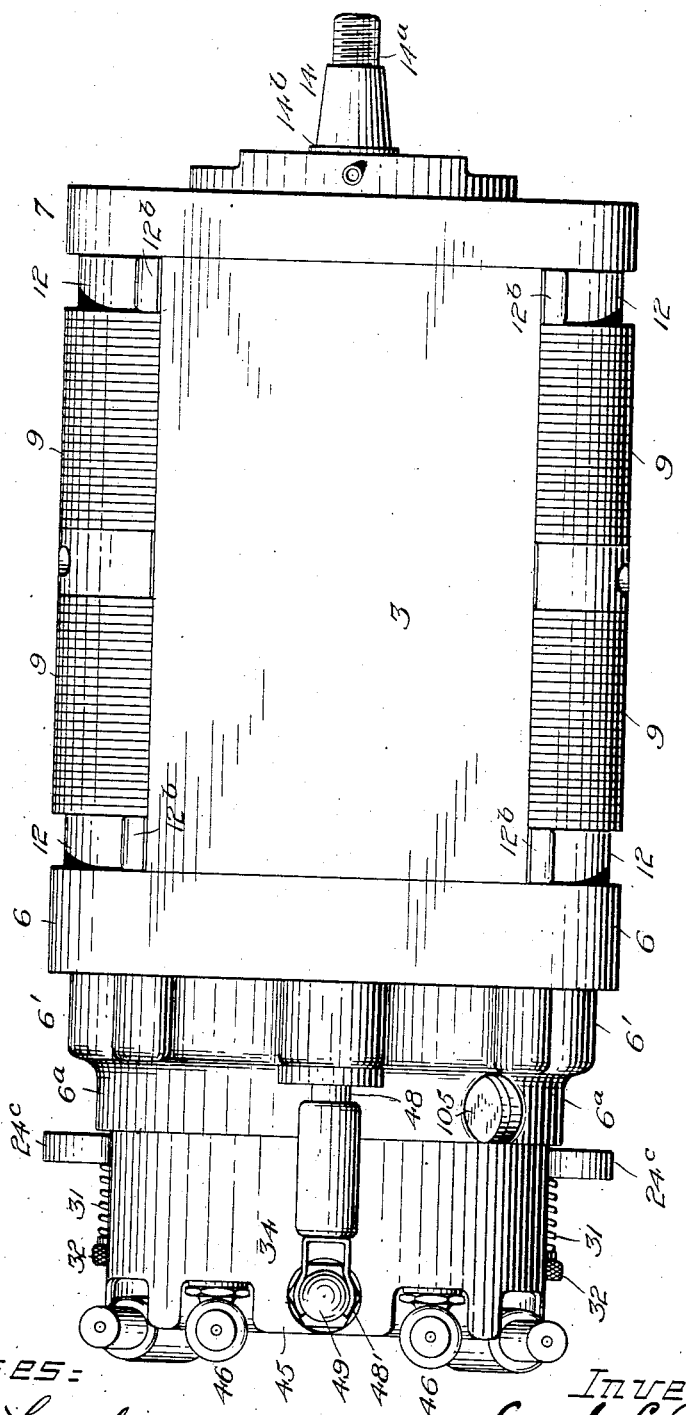

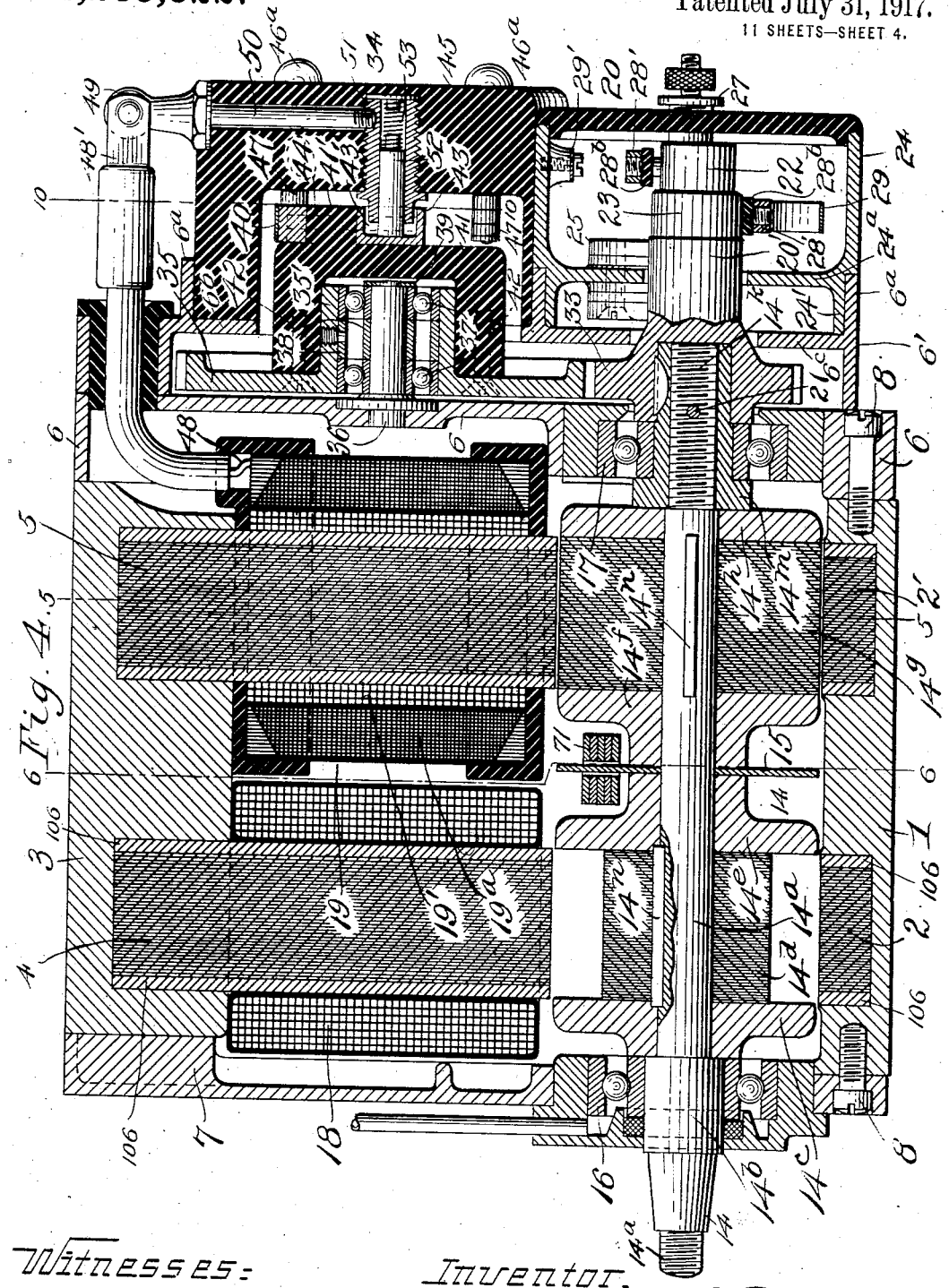

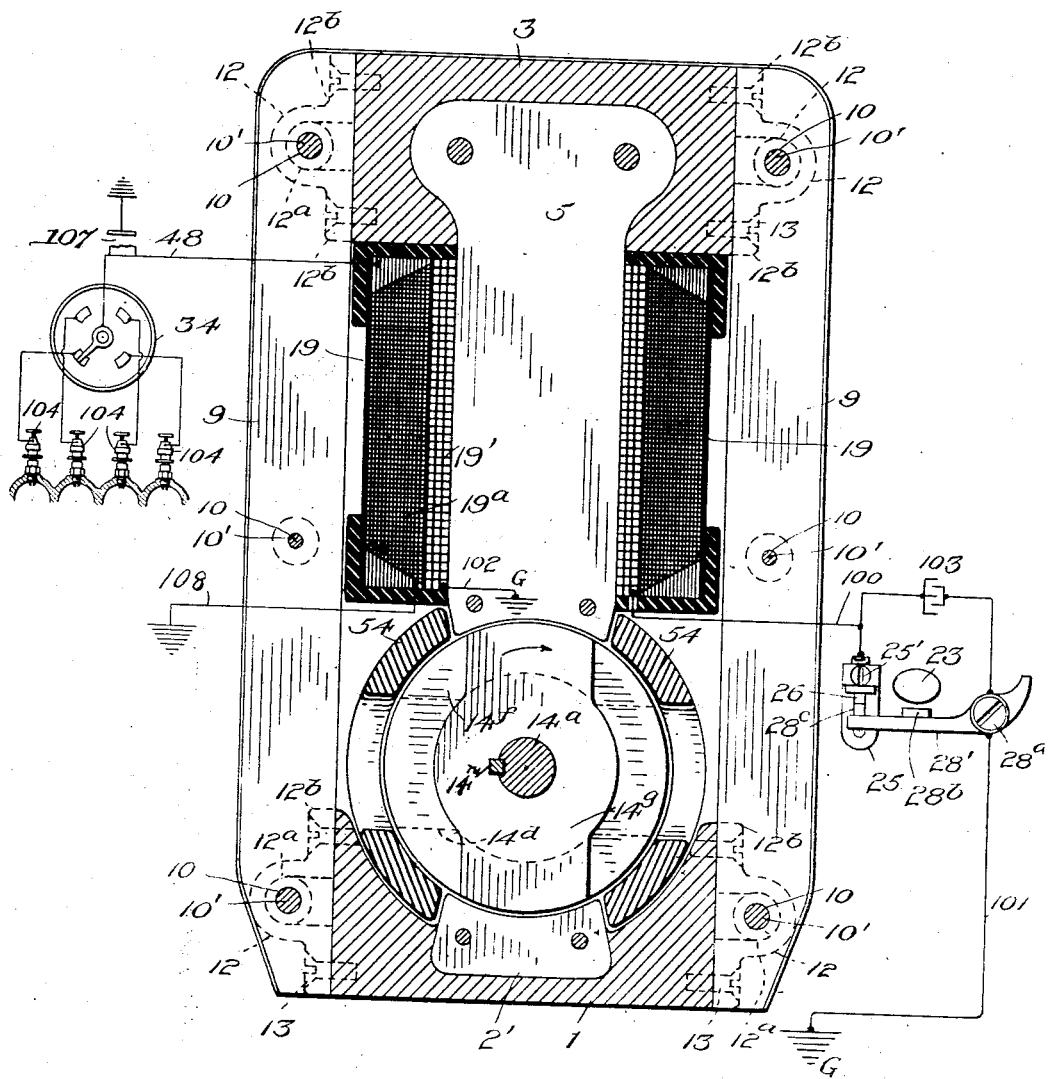

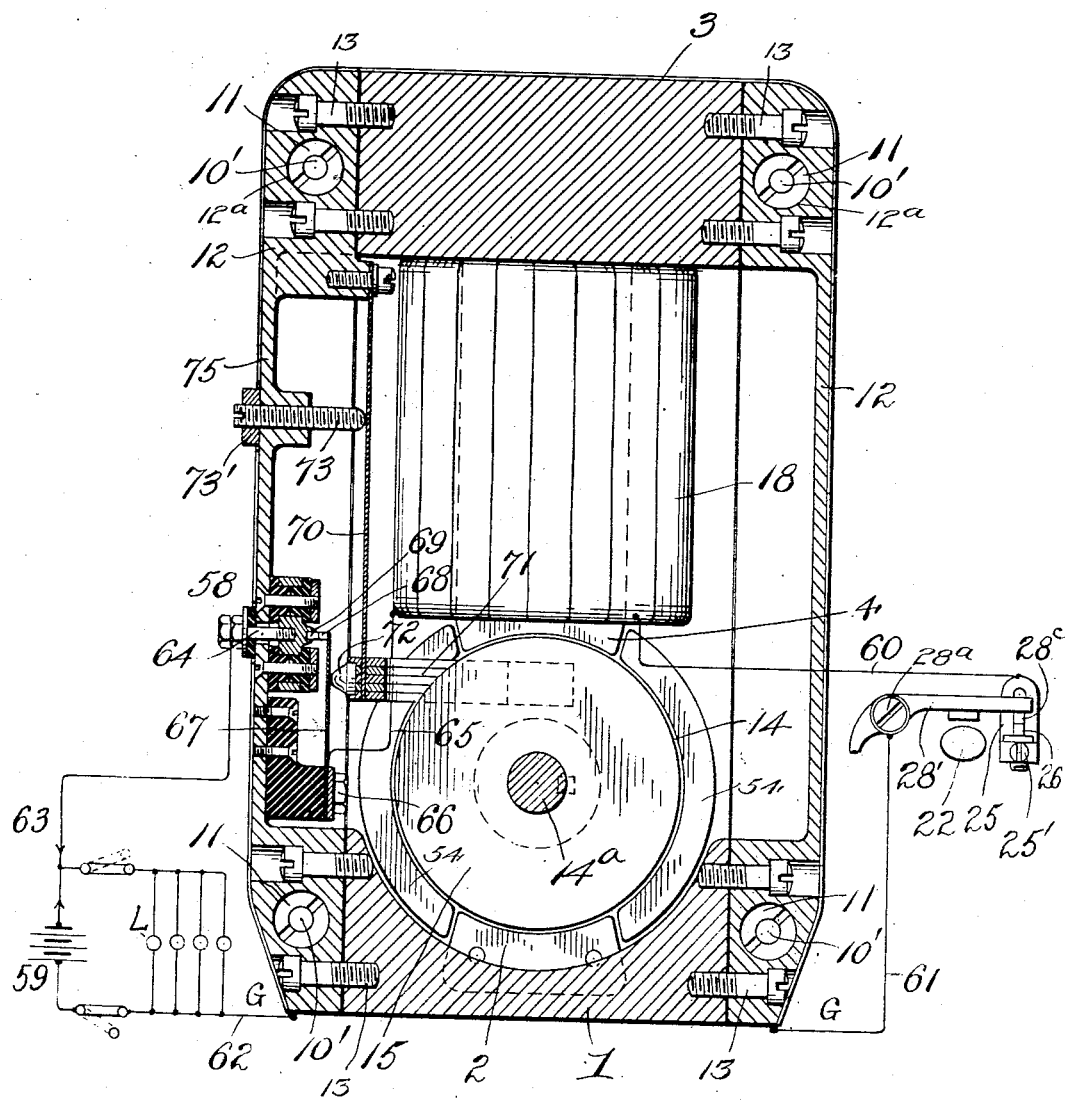

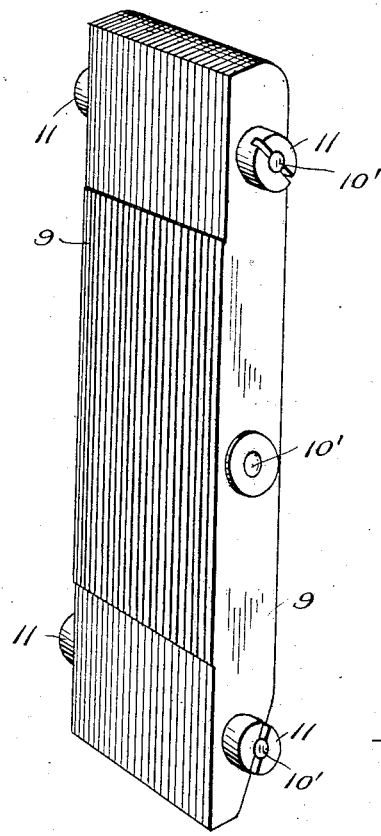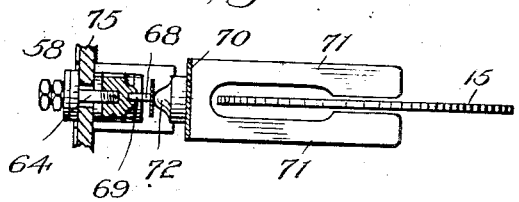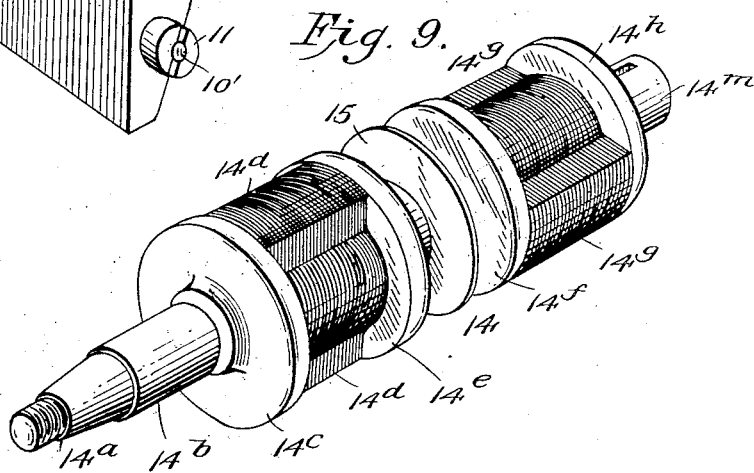

L. J. LE PONTOIS.
SYSTEM AND METHOD OF GENERATING AND UTILIZING ELECTRIC CURRENTS FOR IGNITION AND BATTERY STORING PURPOSES.
APPLICATION FILED DEC. 7, 1910.
1,235,522.
Patented July 31, 1917.
11 SHEETS—SHEET 8.
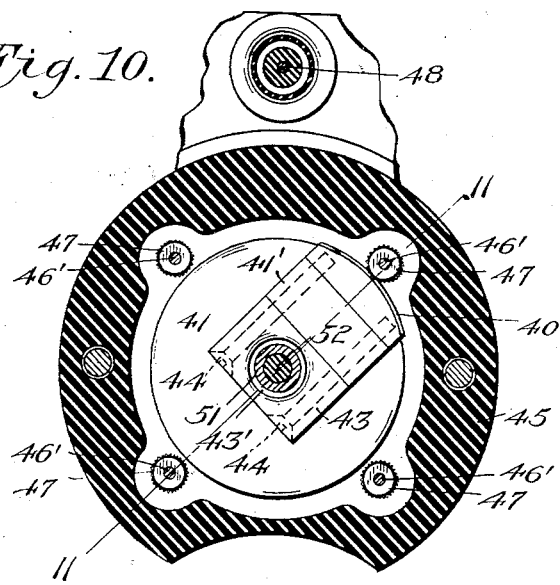
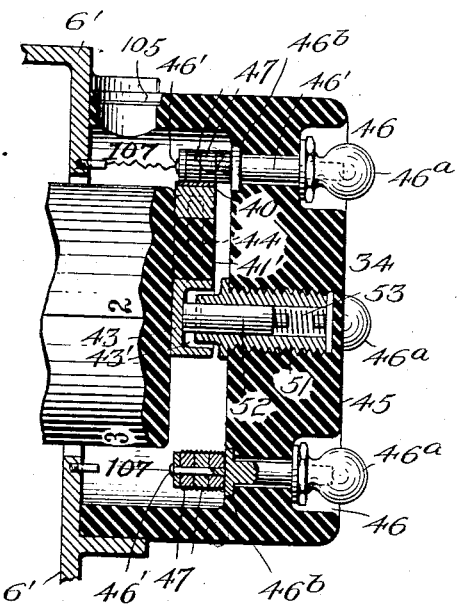
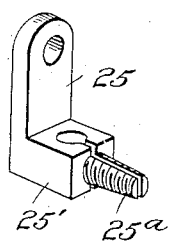
Witnesses:
A. L. Lord.
Geo. A. Pitts
Inventor
Leon J. Le Pontois,
Edward R. Alexander,
Attorney.

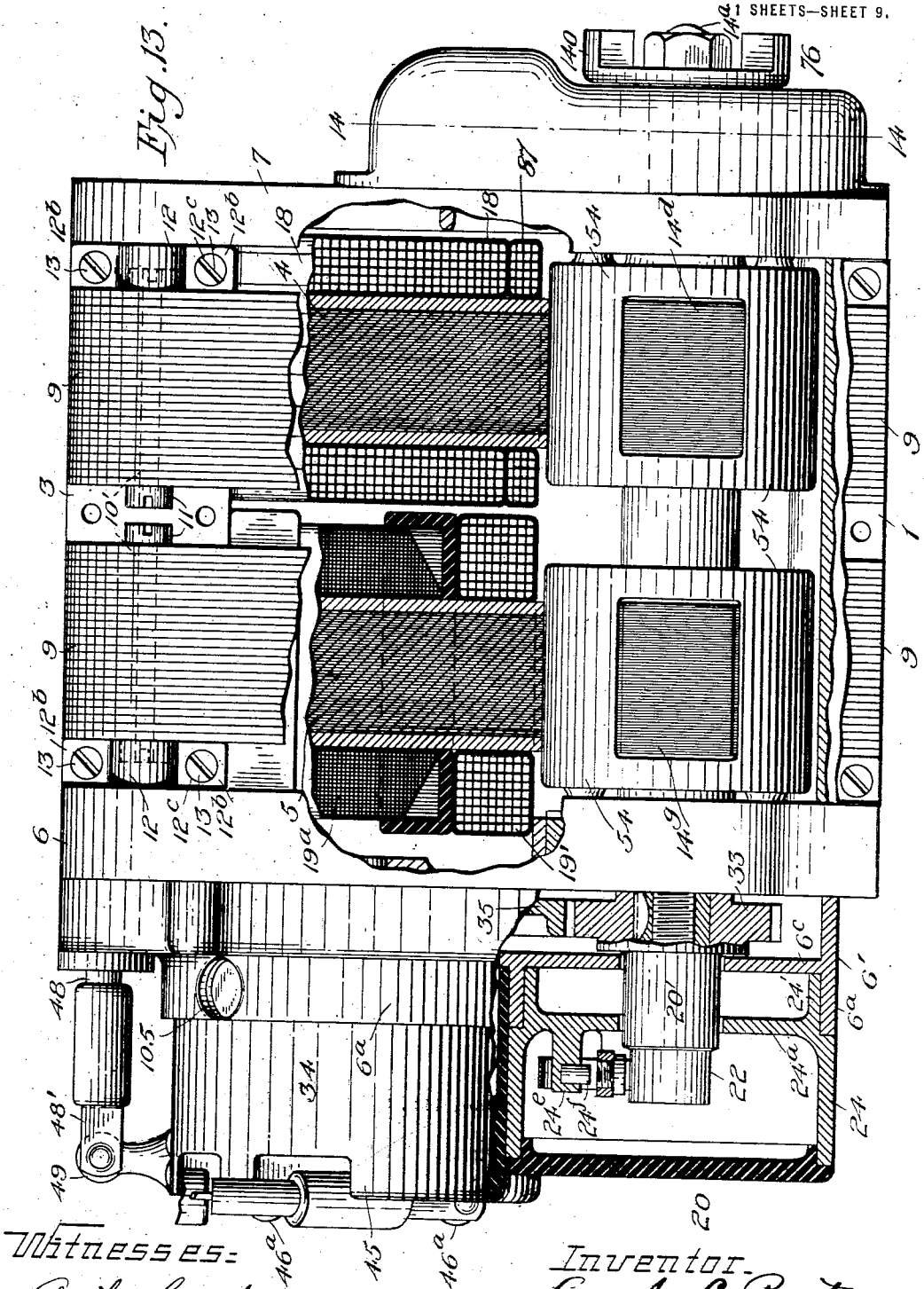

L. J. LE PONTOIS.
SYSTEM AND METHOD OF GENERATING AND UTILIZING ELECTRIC CURRENTS FOR IGNITION AND BATTERY STORING PURPOSES.
APPLICATION FILED DEC. 7, 1910.
1,235,522.
Patented July 31, 1917.
11 SHEETS—SHEET 10.
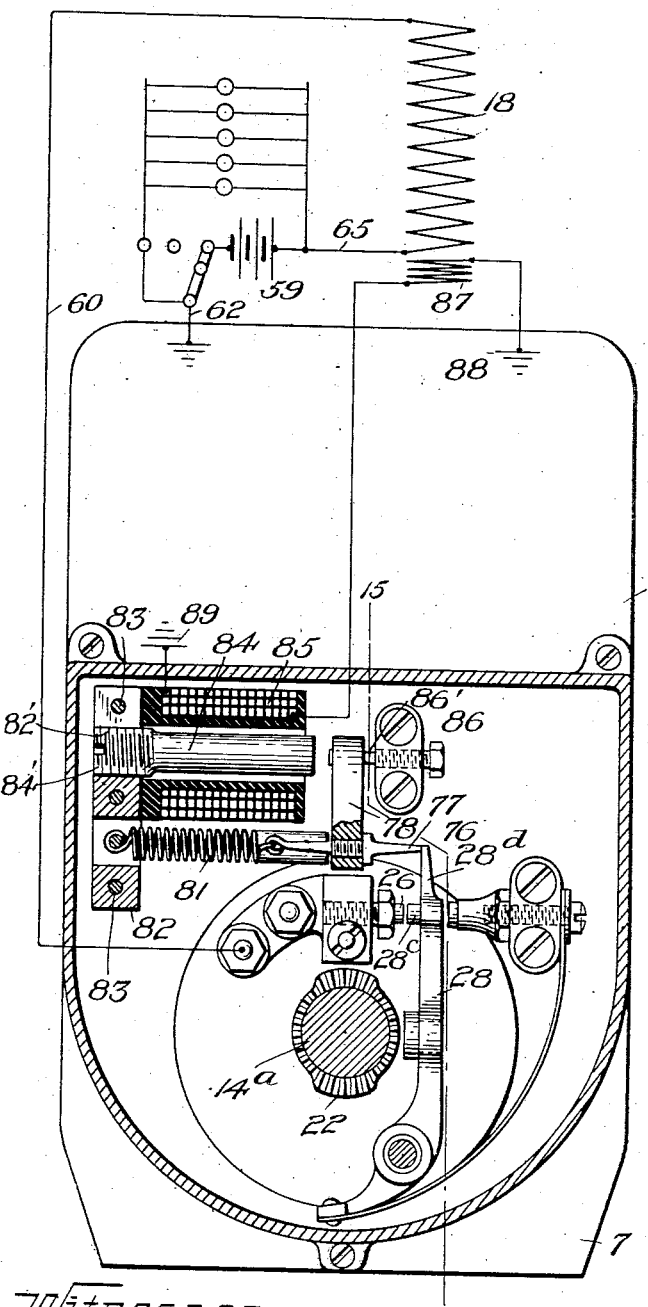
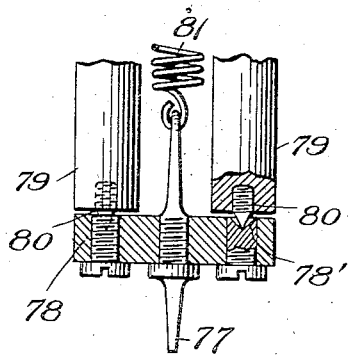
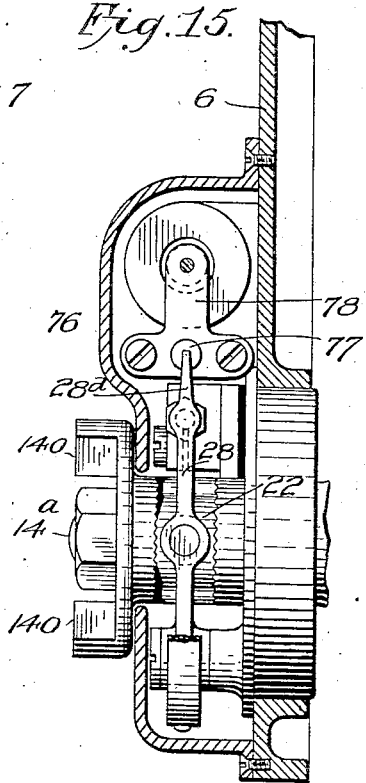
Witnesses:
A. L. Lord.
Geo. B. Pitts
Inventor.
Leon J. Le Pontois,
Edward R. Alexander,
Attorney L. J. LE PONTOIS.
SYSTEM AND METHOD OF GENERATING AND UTILIZING ELECTRIC CURRENTS FOR IGNITION AND BATTERY STORING PURPOSES.
APPLICATION FILED DEC. 7, 1910.
1,235,522.
Patented July 31, 1917.
11 SHEETS—SHEET 11.
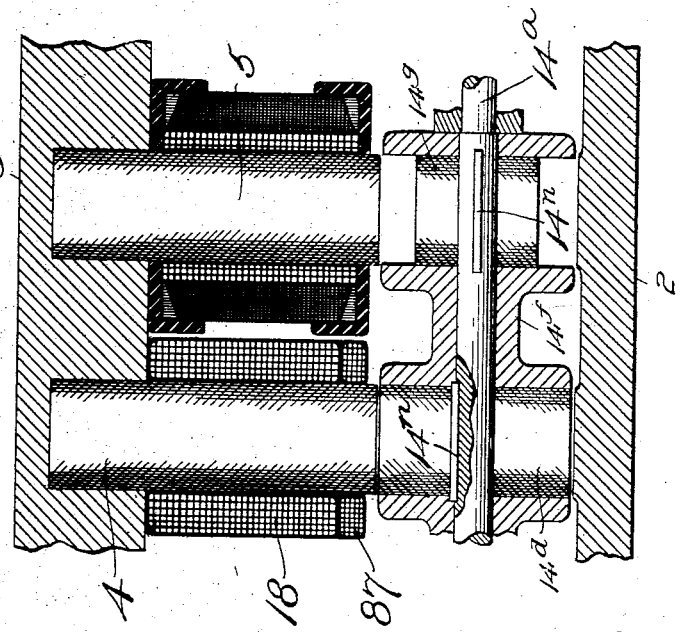
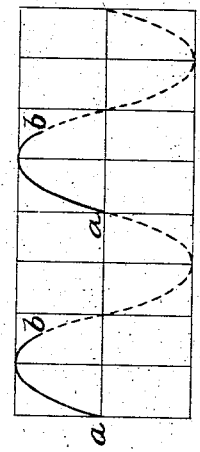
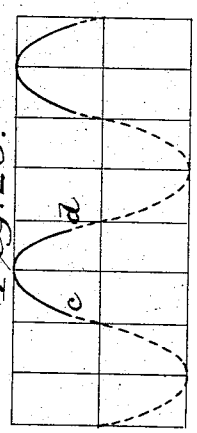
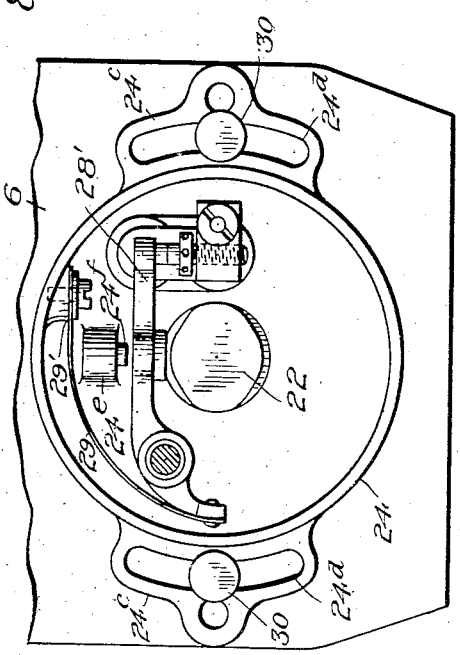
Witnesses:
A. L. Lord.
Inventor.
Leon J. Le Pontois.
Attorney.

UNITED STATES PATENT OFFICE.

LEON J. LE PONTOIS, OF CLEVELAND, OHIO.

SYSTEM AND METHOD OF GENERATING AND UTILIZING ELECTRIC CURRENTS FOR IGNITION AND BATTERY-STORING PURPOSES.

1,235,522.     Specification of Letters Patent.     Patented July 31, 1917.

Application filed December 7, 1910. Serial No. 596,117.

*To all whom it may concern:*

Be it known that I, LEON J. LE PONTOIS, a citizen of the Republic of France, residing at Cleveland, in the county of Cuyahoga and State of Ohio, U. S. A., have invented certain new and useful Improvements in and Relating to Systems and Methods of Generating and Utilizing Electric Currents for Ignition and Battery-Storing Purposes, of which the following is a specification.

This invention relates to methods of and apparatus for generating and storing electric currents for ignition and other purposes.

One of the principal objects of my invention is the provision of an improved method of periodically and successively generating in the same magnetic field, currents which differ in phase from each other and may be readily employed for different purposes. And a further object of the invention is the provision of an efficient system of devices by means of which such improved method can be carried out. Such a method of generating electric currents, and such a system of devices, may, for example, be employed in a combined ignition and lighting system for motor cars. The current of one phase may be used for ignition purposes, and that of another phase for lighting or battery charging purposes.

I have found in order to obtain from the same magnetic field structure the electrical energy required for the above mentioned purposes that it is advisable to so control the closing and opening of the separate generating circuits utilized for different purposes, or their respective resistances or impedances, that they do not exert any action or re-action on each other, and that each generating coil fully benefits in turn by the change of or variations in the density of the magnetic field which threads periodically there-through.

It is a well known fact that in ignition systems where an electric generator is employed to deliver energy directly to the sparking circuits, the generator is not called upon at all times to deliver energy for ignition purposes, in reality current only being required periodically when it is necessary to ignite a charge of gas. Accordingly, I have thought to derive from the same generator, or in other words from the same magnetic field structure, but from separate generating windings, electric energy for use other than for ignition purposes, at times during the operation of the generator, when it is not called upon to deliver current to the ignition circuits.

Another object of my invention has been to invent a method of utilizing the energy of a permanent magnet in the charging of storage batteries by distributing the flux of the magnet in relation to a generating coil so as to generate alternating electric current waves and so connecting the terminals of the generating coil to the terminals of the battery that only such parts of the current are used as are generated in the coil by decrease of magnetic flux therethrough, thus avoiding deterioration of the permanent magnet.

Another object of my invention is the provision of an improved system for charging storage batteries from a source of alternating electro-motive force, the average value of which varies irregularly. Apparatus for generating currents for ignition purposes are driven at speeds varying through a wide range so that the average value of the electro-motive force generated also varies widely. To make possible the utilization of such an irregularly variable source of electro-motive force for the charging of batteries, my invention contemplates the automatic varying of the time of making connection between the source of electro-motive force and the terminals of the battery as the average value of the electro-motive force varies, thus preventing the connection of the source of the electro-motive force and the battery terminals when the electro-motive force is less than the voltage of the battery.

Another object of my invention is the provision of improved means for closing and interrupting an electrical circuit, such means being controlled by the voltage of the current in the circuit and being adapted to prevent the closure of the circuit when the voltage falls below a certain value, the improvement being especially useful in a battery charging system, such, for example, as is set forth herein.

In the following description I give in detail the manner of carrying out my improved methods, and in the accompanying drawings I set forth forms of my improved system for generating and storing electric currents for ignition and other purposes, such as are at present preferred by me.

In the accompanying drawings,

Fig. 2 is a rear end elevation of the same, the rear end plate for the circuit closing and opening mechanism being removed.

Fig. 3 is a top plan view of the electric generator.

Fig. 4 is a vertical longitudinal section of the same.

Fig. 5 is a section on the line 5—5 of Fig. 4, with the ignition circuit shown diagrammatically.

Fig. 6 is a section on the line 6—6 of Fig. 4, with the lighting circuit shown diagrammatically.

Fig. 7 is a perspective view of one of the magnets detached.

Fig. 8 is a view partly in top plan and partly in section of a portion of a governor mechanism.

Fig. 9 is a perspective view of the inductor rotor detached.

Fig. 10 is a section on the line 10—10 of Fig. 4.

Fig. 11 is a section on the line 11—11 of Fig. 10.

Fig. 12 is a perspective view of one of the breaker terminal plates detached.

Fig. 13 is a view partly in side elevation and partly in section showing a modification of my invention.

Fig. 14 is a section on the line 14—14 of Fig. 13.

Fig. 15 is a section on the line 15—15 of Fig. 14.

Fig. 16 is a view partly in plan and partly in section of a portion of a governer mechanism.

Fig. 17 is a sectional view, somewhat diagrammatic, illustrating a modification of my invention.

Fig. 18 is a partial rear end view of the electric generator illustrated in Fig. 14, the end plate for the breaker casing being removed.

Figure 1:
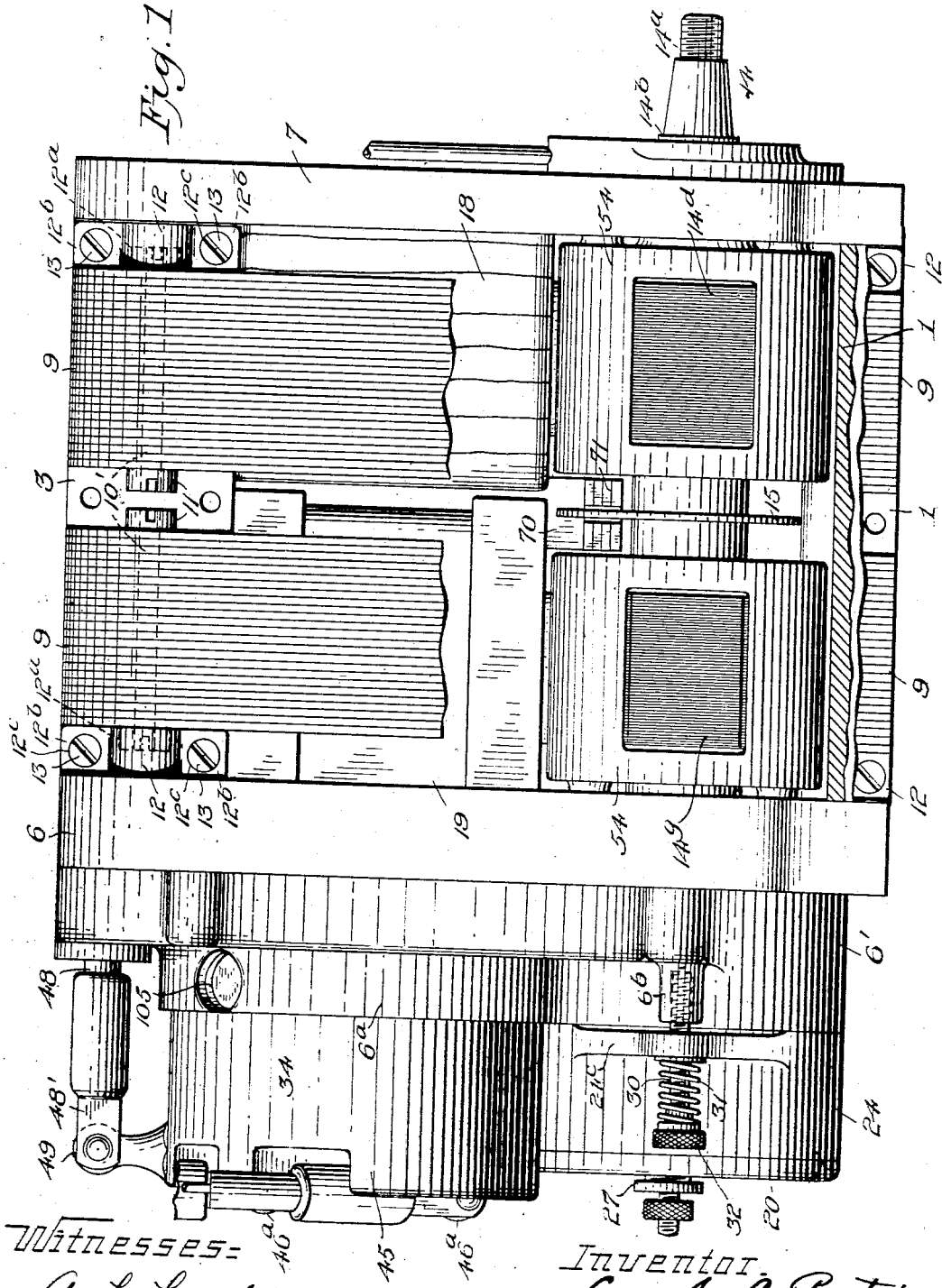
Figure 1 is a view partly in side elevation and partly in section of an electric generator in accordance with my invention.

Figs. 19 and 20 diagrammatically illustrate current waves.

In Figs. 1 to 11 inclusive of the drawings 1 indicates a suitable base, preferably of magnetic material, for the generating apparatus. In one of the constructions which I have made, this base piece 1 has integral with it separated polar projections or portions which extend longitudinally of the base and at right angles thereto. This enables me to form the base and polar projections, in reality the lower pole-piece, in a single integral mass. Somewhat better results may possibly be obtained by forming the polar projections of laminæ of soft steel or iron and casting or molding them in position in the base 1. Such laminated polar projections are indicated at 2, 2' in the drawings.

3 is a pole-piece oppositely disposed to the combined base 1 and polar projections 2, 2'. In the illustrated embodiment of my invention this upper pole-piece carries two downwardly extending projections 4 and 5, each of which is preferably formed of soft iron or steel laminæ, embedded in the mass 3. The pole-piece or mass 3 may consist of a grade of soft iron suitable for casting, and the laminated polar projections may be embedded in the said pole-piece or mass by casting, or molding, the mass around them. In practice I have found this to be a highly satisfactory and economical method or process of forming the pole-piece 3 with the laminated polar projections 4, 5, and also the pole-piece or base 1 with laminated polar projections 2, 2'. The patterns for the pole-pieces may be placed in the sand in order to get the desired shape within the flask, then the ends of the laminated polar projections which are to be embedded in the mass as cast may be introduced the desired distance into the cavity in the flask and there suitably held in position. These ends may be coated with any suitable substance for insuring a perfect cohesion or union between the cast metal and laminated metal. Then the cast metal may be flowed into the flask so as to embed the ends of the polar projections in the thus formed pole-piece. It will be understood that the method just described may be varied in any desired particular, as will occur to the mind of one skilled in the art of casting or molding.

After the pole-pieces with the laminæ polar projections have been thus formed so that such laminæ are integral with the mass of the pole-piece, the whole, if desired, may be annealed; in which event the resulting mass is not as much subject to hysteresis losses, as would otherwise be the case. The pole pieces 1 and 3 may then be shaped or worked up in any suitable manner so as to be of the proper proportions.

They are held suitably disposed relative to each other by end plates 6, 7, formed of non-magnetic material. Each of such end plates may at its lower end be secured to the adjacent end of the pole-piece or base 1, in any suitable manner, as by screws 8, and at its upper end to the pole-piece 3 in a similar manner, thus providing a substantially rigid frame or structure.

9 are permanent magnets, preferably they are straight bar magnets. They may be prepared in any suitable or well known manner and of any desired cross-section and length. I have found it in practice advantageous to form these magnets of laminæ of sheet metal each individually hardened, for reasons well known in the art of permanent magnet making. As illustrated each magnet consists of a series or groups of laminæ arranged side by side; the laminæ may be held together in any well known manner. In the drawings, for illustration, I have shown each lamina pierced adjacent to either end by holes 10 through which pass tie-rods or bolts 10'. Each end of a tie-rod is threaded to receive a nut 11, preferably circular in form. The opposing nuts on each tie-rod may be screwed up and adjusted so as to clamp the laminæ between them tightly together. In some instances it may be desirable to magnetically insulate the laminæ from each other, as by means of shellac, paper, or any suitable non-magnetic material. The magnets 9 are held in place with their lower ends in contact with the base or pole-piece 1 and their upper ends in contact with the pole-piece 3, in any suitable manner, as by means of clamping plates 12. It will suffice to describe simply one of these clamping plates. It preferably consists of a piece of metal recessed at its center as indicated at $12^a$ to receive the nuts 11, and having at each side of said central recessed portion an extension or wing $12^b$ having holes $12^c$ for screws 13 threaded into the metal of the adjacent pole-piece, and serving when set up to force the clamping plate against the nut or nuts 11, with which it engages, and to firmly clamp the adjacent end of the magnet or magnets against the pole-piece.

14 indicates as an entirety a magnetic flux distributer or unwound inductor rotor. In the illustrated embodiment of my invention this rotor consists of a shaft $14^a$ which may be of any suitable metal, such as steel, having near its front end an enlargement $14^b$, and near its rear end a screw threaded section $14^k$, a disk or plate $14^c$ of non-magnetic material, suitably shaped metal laminæ $14^d$ of high magnetic permeability, such as soft steel, a plate or disk $14^e$ oppositely disposed to the plate or disk $14^c$, a copper disk 15 forming part of a governor mechanism to be hereinafter described; a plate or disk $14^f$ of non-magnetic material, more laminæ $14^g$ of magnetic material of high permeability, substantially similar shaped to the laminæ $14^d$ and arranged upon the shaft $14^a$ so that their long axis is substantially at 90 degrees to the long axis of the laminæ $14^d$, a plate or disk $14^h$ of non-magnetic material oppositely disposed to the plate or disk $14^f$, and an elongated nut $14^m$ which when set up serves to rigidly clamp together the various disks, laminæ and shaft constituting the rotor. In practice it is advisable to key the non-magnetic disks and laminæ of magnetic metal to the rotor shaft, as by means of keys $14^n$. It will be noted that this inductor rotor comprises two magnetic flux distributing sections, each arranged to control, independently of the other, the substantial opening and closing of the magnetic circuit between the polar projections with which each said section is arranged to register.

The rear end of the rotor shaft may be suitably shaped to receive any well known type of driving connection. The rear end of the shaft may carry or be connected with suitable timing mechanism or current controlling devices to be hereinafter described.

The combined base and pole-piece 1 is so formed that the polar extensions or projections, 2, 2' thereon will be disposed directly below and in the vertical transverse plane of the laminated polar projections 4 and 5, respectively. After the frame work of the magneto consisting of end plates and the two opposite pole-pieces have been rigidly assembled, the polar projections and bearing recesses in said end plates may be bored to receive the inductor rotor and, if desired, suitable anti-friction bearings 16 and 17 located concentric to the axis of the rotor.

The rotor is so shaped and proportioned that when in place the laminæ $14^d$ thereon are between the polar faces of the laminated polar projection 4 and the polar projection 2 immediately beneath it and lie in the same vertical plane transverse to the axis of the rotor as the polar projections 4 and 2, and similarly the laminæ $14^g$ are arranged between the polar faces of the laminated polar projection 5 and the polar projection 2', and in the same vertical plane transverse to the axis of the rotor as the said polar projections 5 and 2'.

Purely for the purpose of illustration, in Figs. 1 to 11 inclusive of the drawings is shown a magneto electric generator and parts thereof adapted to generate in the same magnetic field structure both high tension current suitable for jump-spark ignition and similar purposes, and low tension current suitable for battery charging, lighting, or like purposes. 18 is a winding or coil suitably shaped to surround the laminated polar projection 4 and suitably proportioned to give during the operation of the device the required electrical output for battery charging, lamp lighting, or similar purposes.

19 indicates as a whole a winding or coil capable of delivering high tension current suitable for jump-spark ignition or similar purposes, and comprising a suitably proportioned section 19' of relatively coarse wire and a suitably proportioned section $19^a$ of relatively fine wire. The coils 18 and 19 may be held in position in any suitable manner.

Any circuit closer and opener or current controller capable of operation by the herein described rotor to properly control both said high and low tension circuits may be employed. For the purposes of illustration I have shown one indicated as an entirety by 20. The part which rotates with the shaft 14ª consists of a piece of metal 20′ recessed to fit over the nut 14ᵐ to which it may be rigidly secured by means of a taper-pin 21. At the front end of the breaker mechanism are two cams 22, 23, having the long axes of their cam surfaces arranged at suitable angle to each other for purposes to be hereinafter described. 6′ is a casing part or element secured to the rear end plate 6. It has a circular recess with annular flange 6ª to receive the rearward annular extension 24′ of the breaker box or casing 24. Within this casing on the partition 24ª are arranged the insulated terminals for the low tension circuit and the low tension winding of the high tension circuit, consisting of the normally stationary plates 25, each suitably secured to and insulated from the partition 24ª and having a rearwardly extending projection 25′ and carrying an adjustable contact piece 26 mounted at right angles thereto. The extreme front end of the split projection 25′ is reduced to circular form and taper threaded, as indicated at 25ª, to receive a suitable terminal nut or binding post 27, which when set up into position will clamp the adjustable contact 26 firmly in position.

28, 28 indicate as entireties movable or oscillating electrodes. Each comprises an arm 28′ loosely pivoted, as at 28ª to the partition 24ª, preferably a piece of hardened fiber 28ᵇ arranged to contact with the adjacent cam surface 22, and a suitable contact point 28ᶜ. 29 is a spring secured at one end to the tail end of the adjacent arm 28′, and at its opposite end to the breaker casing, as indicated at 29′.

The breaker casing 24 is preferably loosely mounted in the rearward extension 6ª of the casing part 6′, so as to permit of its angular adjustment and the corresponding angular adjustment of the electrodes carried by it, for purposes to be hereinafter described.

6ᵇ are lugs, one arranged at either side of the rear end plate 6. 30 are rearwardly extending studs or rods, each at its front end secured to the adjacent lug 6ᵇ. At either side the breaker casing 24 has laterally extending lugs or projections 24ᶜ, each having a slot 24ᵈ therein arranged in the arc of a circle struck from the axis of the breaker casing as a center. The studs or pins 30 each extend rearwardly through the adjacent curvilinear slot 24ᵈ in the breaker casing. The breaker casing is held yieldingly in place by means of springs 31, each arranged on the outer end of one of the stems 30. 32 are adjustment nuts for regulating the degree of compression of said springs. The stems 30 limit the angular adjustment in either direction of the breaker casing by engagement with the walls at the ends of the curvilinear slots 24ᵈ in the breaker casing.

The front end of the element or member 20′ having at its rear end cams 22, 23, may be cut to form a driving gear 33. While in the illustration this driving gear is shown integral with parts 22, 23, it will be understood that it may be formed separately therefrom if desired. It is arranged at the front of the partition 6ᶜ in the casing element 6.

34 indicates as an entirety a high tension current distributer mechanism. It may be of any suitable or well known construction adapted for use on the magneto generator herein shown. For the purpose of illustration it is shown as comprising a driven gear 35 meshing with the driving gear 33 and mounted on a stationary stud shaft 36 carried by and extending rearward from the end plate 6.

37, 37 are anti-friction bearings carried by the shaft 36 and separately spaced from each other by spacing ring 38. The driven gear 35 has a forwardly extending flange or hub 35′.

40 is the rotary distributer segment, made of any suitable non-corrodible material. It is carried by the gear 35 and insulated therefrom by a suitable insulating hub or member 41. The latter is suitably spaced relative to the shaft 36 and bearings thereon by a plate or washer 39 secured to the outer end of the shaft 36. This insulated member may be secured to gear 35 by screws 42. 41′ is a rearward extension or ear on the insulating member or hub 41. 43 is a contact block centrally recessed as indicated at 43′. The contact segment 40 and contact block 43 are electrically connected together and suitably secured to rotate with the insulating member 41, by means of screws 44 extending through the contact block 43 and the ear or lug 41′ on the insulating block 41 and into the distributer segment 40. This construction precludes any relative movement of the parts thus connected.

45 indicates a distributer box or casing formed of any suitable insulating material. In the illustration it is provided with four contact terminals 46, each of these terminals comprising a stud or shaft 46′, having secured to its outer end a suitable contact terminal or binding post 46ª; near its end it carries a head 46ᵇ by means of which it may be held against turning relative to the distributer casing; and inside of the said head and loosely mounted on the stud are arranged a plurality of rollers 47 of non-corrodible metal. Preferably each of these rollers is formed with a riged or knurled periphery. They may be held from longitudinal movement on their shaft in any suitable manner, as by riveting or up-setting the end of the shaft.

48 indicates the high tension lead or conductor from the high tension winding 19. It is provided with a contact terminal 48' of any suitable construction. The one illustrated is intended to make electric contact with a binding post or terminal 49 carried by the distributer casing 45. 50 is a conductor leading from the binding post or terminal 49 to and electrically connected with a socket piece 51 removably mounted in the distributer casing 45. 52 is a brush having its axis concentric with the axis of the distributer casing and mounted in the socket piece 51, so as to be movable longitudinally therein. 53 is a spring mounted in the socket 51 and arranged to normally press the brush 52 forward and into engagement with the vertical wall of the recess in the contact block 43.

In order to react against any tendency which may be present for magnetic flux leakage as between the polar faces of two opposing polar projections and the corresponding flux distributing section of the inductor rotor and from the polar faces of said inductor section to the adjacent magnets, stationary, short circuited copper circuits 54, may be arranged, if desired, one at either side of each of the flux distributing sections of the inductor rotor, and each suitably insulated from and secured in position relative to adjacent stationary metal parts. Each of these copper circuits is preferably disposed so as to surround any flux tending to leak from either polar face of the rotor to the adjacent magnet, more particularly when the long axis of the flux distributing section is substantially at right angles to the magnets. It will be noted that the counter magneto motive force set up by any current flowing in such short circuited coil will oppose the flux tending to thread through such coil from the polar faces of the inductor. Accordingly the said copper circuits 54 act to compel the flux variations to take place substantially entirely through the magnetic paths controlled and determined by the positions of the flux distributing sections of the rotor and their corresponding pole pieces.

When it is desired to charge a storage battery from the low tension current circuit of the magneto generator, that is from the winding 18, I have found it advisable to interpose in the circuit between the storage battery and the generator winding 18, not alone the circuit breaker controlled by the cam 22, but also a governor mechanism for opening and closing the battery charging circuit according to whether or not the voltage of the magneto generator is less or greater, respectively, than the voltage of the battery. It will be noted that were the circuit from the low tension generating winding 18 always closed during the rotation or oscillation of the inductor rotor, an alternating current would be generated in said winding. I have so arranged the maker and breaker controlling that current, that the circuit is only made or closed during the generating in the said winding 18 of current waves established or generated by flux decrease through the said generating winding, the said circuit being opened during the time when the opposite or waves due to flux increase would be generated. By means of such maker and breaker it will be understood that use is made of a direct pulsating current. The governor is necessary for the purpose of insuring that the circuit to the battery will be closed only when the voltage of the generating winding circuit is equal to or superior to that of the battery to be charged. This governor mechanism is indicated as an entirety by 58. Referring now particularly to Figs. 6 and 8, 59 indicates a storage battery of any suitable voltage. 60 indicates a conductor leading from the winding 18 to the maker and breaker controlled by the cam 22. 61 is a conductor leading from said maker and breaker to the ground or frame of the magneto. 62 is a conductor leading from ground or frame of the magneto to one pole of the battery 59. 63 is a conductor leading from the other terminal of said battery to an insulated terminal or binding post 64, suitably carried by the frame of the magneto. 65 is a conductor leading from the other end of the generating winding 18 to the binding post or terminal 66 insulated from and carried by a part of the magneto frame.

67 is a spring at its lower end in electric contact with conductor 65 and at its upper end carrying contact point 68, which contact point is adapted to move into and out of engagement with stationary contact point 69 electrically connected with the binding post 64 and suitably insulated upon the frame of the magneto. 70 is a relatively long stiff spring suitably secured at its upper end to the magneto frame and carrying at its lower end a comparatively small magnet 71, which may be either permanent or electromagnet. In the drawings a permanent magnet is shown. This magnet 71 straddles the upper portion of the copper disk 15, secured to and rotating with the inductor rotor. 72 is a button interposed between the spring 67 and the adjacent end of the magnet 71. It is insulated upon the latter, and may be made of fiber, if desired. 73 is an adjustment screw for regulating the tension of the spring 70. This screw may be locked in proper position by lock nut 73'. Where a governor of the type just described is used in the magneto, the construction is somewhat simplified by forming the central pair of magnet clamping plates 12 for one side of the field magnet structure, in one piece, such as 75, which may in addition to serving as a clamping bar for the magnets also carry the parts of the governor mechanism just described.

L indicate lamps which may be interposed in the lighting circuit. I prefer, where these lamps are used for lighting, to connect them in parallel with the battery.

Referring now to Fig. 5, in the ignition or high tension circuit, 100 diagrammatically indicates a conductor leading from one terminal of the coil 19' of relatively coarse winding to the electrode 26. 101 is a conductor leading from movable arm 28 to the ground. 102 is a conductor leading from the other terminal of coil 19' to the ground. 103 is a condenser placed in parallel with the contact points 26 and 28$^c$. 104 indicate spark plugs or spark gaps in the circuit of the high tension or fine winding 19$^a$, which also contains the distributer 34, the said circuit being completed through the ground and conductor 108.

In Figs. 13 to 18 is shown a modification of the magneto generator hereinbefore described, consisting essentially of a different style of circuit closing and opening mechanism for the low tension circuit, than the one which is hereinbefore described in connection with a battery charging circuit and also of a somewhat different arrangement of the coarse and fine generator windings of the high tension or sparking circuit. It will not be necessary to describe in detail all of the parts of the generator employed in the modification, as those which are the same as the ones heretofore described have similar designating characters. It will be noted that in this modification the circuit maker and breaker for the ignition system is located at one end, the rear end, of the generator, whereas the circuit maker and breaker for the lighting system is located at the opposite, or front end of the generator. It will be understood that these relative positions of the breakers may be reversed, if desired. Furthermore, it is not thought necessary to describe the ignition system circuit maker and breaker, which may be of any preferred form and is substantially the same as the one heretofore illustrated and described for the same purpose with the exception of an ear or lug 24$^e$ carrying a contact piece 24$^f$ with which the movable electrode may engage to limit its outward movement, and in addition thereto the insulated terminal construction is slightly different, but obviously does not require description.

The maker and breaker mechanism for the lighting circuit is designated as an entirety by 76 and is arranged between the front end plate of the magneto and the clutch coupling 140 on the inductor shaft. The same style of cam may be used in this breaker as the one heretofore described and is designated by the numeral 22. As a matter of fact, the coupling element 140 and this cam 22 may be formed integral, if desired, and may be positioned rigidly on the shaft 14$^a$, in any well known manner not shown. I prefer to construct this lighting cam 22, however, so that it is angularly adjustable relative to the axis of the inductor shaft in order that the cam may easily be properly set so as to open and close the lighting circuit substantially only when the voltage of the generating windings in the lighting circuit is superior to the voltage of the battery. For this purpose the cam 22 is shown as radially serrated or grooved on one face and the adjacent face of the coupling 140 is similarly serrated or grooved. The cam 22 may therefore be adjusted to the desired position and thereupon the coupling element 140 moved into engagement therewith and secured against angular movement relative to the inductor shaft 14$^a$. The normally stationary contact point 26 and its mounting is similar to that hereinbefore described and the movable electrode 28 is likewise similar to the one hereinbefore described, with the exception that its free end is extended as indicated at 28$^d$ so as to project into the path of a movable control element or stop 77. This stop is carried by an armature 78 of an electro-magnet comprising a pair of bars 79, preferably magnetically polarized, carrying taper pivot pins 80, each seated in taper sockets 78' of the armature 78 and held in engagement with the walls thereof by means of a spring 81 secured at its front end to a rear extension on stop 77 and at its other end to the base 82 of the electro-magnet, which latter is in turn secured by screws 83 to the end plate 7. 84 is an adjustable magnet core. It is screw-threaded as indicated at 84' and fitted into a similarly threaded passageway 82' through the base 82, so that the core may be adjusted longitudinally relative to the free end of the armature 78. 85 is the coil of the electro-magnet suitably insulated from the base 82 and supported thereby. 86 is an adjustable stop for limiting the outward movement of the free end of the armature and tending to prevent the oscillation thereof. It may be provided at its inner end with a point 86' of rawhide or other suitable material for buffeting or cushioning the impact between it and the armature.

The electric current for operating the electro-magnetic control of the circuit maker and breaker may be derived from any suitable source. For this purpose I prefer to select a source depending upon the speed of rotation of the inductor rotor and the magnetic density of the field in which the generating coil of the lighting circuit is located. Accordingly I have arranged, preferably upon the same pole piece 4 on which the lighting coil 18 is arranged, a generating winding 87 consisting of a few turns, preferably, of fine wire so that this winding 87 in itself and through its reaction will not materially affect the magnetic flux variation in the pole piece 4 and light coil 18. One terminal of this coil 87 is connected to the ground, as indicated at 88, and at its other end it is connected to one of the terminals of the winding 85, the other terminal of which latter is connected to the ground as indicated at 89.

In Fig. 13 it will be noted that the primary winding 19' is arranged as closely adjacent to the polar face or tip of the pole piece 5 as it can be gotten and that the fine wire winding 19ª is disposed above it and as closely adjacent to the iron of the pole piece 5 as it is possible to get it, for purposes to be hereinafter described.

The numerals 2 and 3 on the distributer section 43, as illustrated in Fig. 11, indicate, when brought into registry with the glazed opening 105 of the end section 6ª, as illustrated in Fig. 1, that the device is distributing either to cylinder 2 or 3 as the case may be. It will be understood that the numerals 1 and 4 (not shown) may also be carried by the distributer section 43.

In order to hold together properly for assembling purposes the lamina of the polar projection, soft iron binders or end plates 106 may be employed as illustrated in Figs. 4 and 13.

At 107 (Figs. 5 and 11) I have indicated safety spark gaps for the high tension circuit.

In operation, assuming that the rotor 14 is in the position indicated in Figs. 4 and 5, substantially all the flux issuing from the poles of the permanent magnets 9 will find a path of least reluctance through the pole piece 3, polar projection 5, inductor laminæ 14ˢ and pole piece or base 1 and back to the other poles of the magnets. At substantially that instant the maker and breaker of the ignition circuit is closed, that is, the electrode 28ᶜ is in engagement with the electrode 26, or in other terms, the coarse winding 19' is short-circuited upon itself. If now the inductor rotor is moved in the direction indicated by arrow in Fig. 5, the polar faces of the laminated section 14ᵍ commence to move away from the polar faces of the pole pieces 2' and 5, and at the same time the polar faces of the laminated section 14ᵈ enter between the polar faces of the polar projections 2 and 4. At this period the reluctance of the magnetic circuit between the polar projections 2' and 5 increases, whereas simultaneously the reluctance between the polar projections 2 and 4 is decreasing, accordingly the magnetic flux density in the windings 19' and 19ª is tending to decrease, though such decrease is not proportional to the relative apparent reluctance of the two then existing magnetic paths open to the flux, because of the fact that the winding 19', that is the coarse winding on the polar projection 5 is short-circuited upon itself and therefore its self induction tends to oppose flux variation through the coil 19'. As the rotation in this direction continues the reluctance of the path between the polar projections 2 and 4 decreases and that between polar projections 2' and 5 increases simultaneously until the critical point is reached at which the tendency to flux change reaches its maximum, at or about which point the cam 23 positively opens the circuit of the winding 19' and the magnetic flux still threading through the coils 19' and 19ª being suddenly unchoked finds an immediate path of low reluctance between the polar projections 2 and 4, as at this time the laminated inductor section 14ᵈ establishes a path directly between the last two mentioned polar projections. Under these conditions the rate of flux variation through the windings 19' and 19ª is so high as to cause a current of high tension to be generated in such windings which is manifested by a spark at one of the spark gaps 104. It will be noted that while this flux change was taking place due to the decreasing flux threading through the generator windings 19' and 19ª, and a substantially corresponding increase of flux variation was taking place through the winding 18, the circuit of this latter winding was open, the construction of this cam 22 and the circuit making and opening mechanism positively insuring the maintenance of this open circuit at this time. Therefore no work was required of or was done by the flux in forcing its way through the winding 18 and consequently this winding lent substantially no opposition to the flux variation as between the polar projections 2 and 4 on the one hand and the polar projections 2' and 5 on the other. Continuing the rotation of the inductor in the same direction, the polar faces of the laminated inductor section 14ᵈ and 14ᵍ moving relative to the polar faces of the polar projections 2, 4 and 2', 5, respectively, cause continuing changes in paths of least magnetic reluctance, the reluctance between the polar projections 2' and 5 decreasing and that between the polar projections 2 and 4 increasing as the case may be. As soon as this change in paths of least magnetic reluctance tends to cause a decrease of magnetic flux density through the winding 18, the cam 22 will permit the engagement of the electrodes 26 and 28 in the lighting circuit. This will close the circuit to the battery, providing that the governor 58 has operated to close the circuit, which governor for its control is dependent upon the speed of the rotation of the disk 15 and accordingly of the inductor rotor. The governor may be so adjusted that it will only close the circuit when the speed of the inductor is such as to insure variations in flux density in the generating winding 18 sufficient to establish a voltage equal to or superior to the battery voltage. It will be understood that the rotation of the copper disk 15 in the field of the magnet 71 will be opposed by reaction of the eddy currents set up in said disk and that such reactions will exert a pull or drag on the magnet in the direction of rotation of the disk 15. The amount of this pull or drag is dependent upon the speed of rotation of the disk 15, and accordingly the spring 70 may be adjusted so that the contact 68 will move into engagement with contact 69 only when the speed of rotation of the disk 15 has reached a predetermined point which will insure that the E. M. F. of the winding 18 is equal to or superior to that of the battery.

I have already pointed out that the circuits through the generating coils are open during increase of flux therethrough so that during increase of flux through the wound pole pieces there is no loss of energy from self-induction of the windings. On the other hand, during decrease of flux through the windings, the winding circuits are closed, and it remains to be observed that the resulting self-induction of the generating coils is taken advantage of, in the case of the low tension circuit to regulate the voltage thereof, it being understood that such regulation is desirable when the current is used direct to energize the lamps. It will be readily observed that although the voltage in the generating winding 18 increases proportionately to the rotor speed, the frequency increases in like proportion and hence the current in the work circuit will not increase in like amount because the inductive resistance of the winding increases proportionately to the frequency. Thus the voltage in the external part of the work circuit can, in a large measure, be regulated by a proper proportionating of the generating winding.

However, this inherent voltage regulation is supplemented in an important manner by the coöperative action of the work circuit and ignition circuit resulting from the peculiar interrelation of these circuits which characterizes my invention. Referring to Fig. 4, it will be observed that while the polar projections 4 and 5 are laminated, for the reasons hereinbefore stated, the pole piece 3 in which their upper ends are embedded is a unitary mass and consequently when the magnetic flux shifts through said mass from one polar projection to the other, eddy currents are set up in the mass having values that vary with the frequency, the eddy currents increasing, of course, with the speed. As these eddy currents oppose the shift of the flux it is apparent that they have the effect of diminishing increase of voltage due to increase in speed. While this effect of the eddy currents is present in the case of both the work circuit and the ignition circuit, its value attaches to the regulating effect on the work circuit. By a suitable arrangement and proportioning of the parts I secure a combined regulating action due to the self-induction of the low tension generating winding, on the one hand, and the eddy currents in the pole piece 3, on the other hand, which has made it unnecessary to provide any special regulating apparatus to control the voltage of the work circuit.

In the modified form of magneto generator illustrated in Figs. 13 to 18 the circuit closing and opening mechanism for the lighting circuit operated by the cam 22 is automatically controlled so that it only closes when the voltage of the generating winding 18 is equal to or superior to the battery voltage. The generating winding 87 for energizing the electro-magnetic winding 85 lies in the same magnetic field and is acted upon and reacts upon the same magnetic flux as the generating winding 18. The E. M. F. of this winding 87 is dependent upon flux variations in the polar projection 4 which is in turn dependent upon the speed of rotation of inductor rotor 14. And in like manner is the E. M. F. of the generating winding 18 determined. Consequently the core 84 of the electro-magnet may be so adjusted relative to the armature 78 as to attract the said armature and draw its free end toward the core only when the voltage of the generating winding 87 has reached a predetermined value, and at which time the voltage of the generating winding 18 is necessarily equal to or superior to the voltage of the battery in the circuit. Normally the cam 22 periodically engages the arm 28' so as to cause the electrode 28$^c$ to move away from the electrode 26. As long as the stop 77 is in the path of movement of the end 28$^d$ of the arm 28, the electrode 28$^c$ cannot engage with the electrode 26 and close the lighting circuit. In fact, it is only when the stop 77, which is electro magnetically controlled, has been shifted or swung out of the path of travel of the point 28$^d$, that the electrode 28$^c$ may engage with the electrode 26 to close the circuit. The core 84 as previously mentioned, may be readily adjusted so as to attract the free end of the armature 78 and swing stop 77 out of the path of the end 28$^d$ only when the voltage of the winding 87 reaches a predetermined value and insures that the voltage of the winding 18 will be equal to or superior to the battery voltage. It will be noted that the stop 77 is never called upon to do any work in getting into position where it will be in the path of the end 28ᵈ of the arm 28. The cam 22 periodically moves the free end of the arm 28, that is the end 28ᵈ, a sufficient distance out of the path of the stop 77, so that the latter may readily and freely swing into the position in which it arrests the action of the breaker. This insures, that should the voltage of the winding 18 drop below that of the battery, and consequently the voltage of the winding 87 below that required to energize the electro-magnetic coil 85 so as to cause the attraction of the armature 78, the stop 77 will instantly and always under such circumstances swing into the path of movement of the arm 28'. In other words, in this modified construction, I have provided for automatically closing the lighting circuit through a single make and break mechanism in such manner that the lighting circuit will be closed for battery charging only when its voltage is equal to or superior to the voltage of the battery.

In Fig. 13, as hereinbefore described, the coarse winding 19' of the high tension or sparking circuit is arranged as closely as possible adjacent to the polar-face or tip of the polar projection 4, and the fine winding 19ᵃ is disposed above, or adjoining it, and arranged as closely as possible to the metal of the polar projection 4. It will be understood that during flux decrease through the windings 19' and 19ᵃ thus arranged, the winding 19' is short-circuited upon itself through the instrumentality of the closing of its circuit closing and opening mechanism controlled by the cam 23 and as this short circuited winding is located on the very tip of the polepiece its tendency to oppose flux decrease is considerably enhanced. In the meantime the winding 19ᵃ is in open circuit and is only closed when a spark or arc takes place between the terminals of one of the spark plugs in its circuit, which will occur at the moment when the circuit of the winding 19' is opened, through the instrumentality of the cam 23, and at which instant the rate of flux change is very high, as the windings 19' and 19ᵃ being in open circuit offer substantially no self inductive action to such a flux change. The potential across the spark plug terminals due to this very high rate of change of magnetic flux density will reach a point where the dielectric therebetween will be broken down and an arc or spark accordingly manifested. It can be thus seen that the winding 19' does not alone act as a so-called primary for the fine winding 19ᵃ, and its electro-magnetic inductive action on that winding is added to that due to the direct inducing action of the flux of the permanent magnetic field. The fine wire winding 19ᵃ is truly a direct high tension current generating winding, and this being the case, it is now evident that such a winding should be placed as close to the iron core or polar projection as possible. Thus by this construction I succeed in greatly increasing the direct generating action of the varying flux on the winding 19ᵃ and can obtain a higher voltage with fewer convolutions of wire, and accordingly a very much larger current through the fine winding, than it would be possible to obtain were a great many more convolutions required to obtain a like potential between the terminals of the spark plug. It will be also noted that a small fraction of the energy of self induction stored in the winding 19' discharges itself through the winding 19ᵃ thus increasing the current value of the spark and therefore its heat.

In Fig. 19 I have represented a sine curve for the purpose of graphically illustrating the idea of making and breaking the ignition circuit at predetermined points of the E. M. F. curve. It will be noted that the circuit maker and breaker should operate to close the circuit only during that period of flux variations through the windings 19' and 19ᵃ when the flux is decreasing, and the circuit should be closed, say for example at $a$, and opened at $b$ or any other points when the voltage is sufficient to cause a spark to occur at the desired spark gap or gaps. In Fig. 20 I have illustrated a sine curve, in order to show graphically the E. M. F. wave of the lighting circuit. Here again the circuit should only be closed when there is flux decrease in the winding 18 and during the time when the voltage of the said generating winding is equal to or superior to voltage of battery, say for example it will be closed at $c$ and opened at $d$. In each of these curves the full lines indicate the periods during which the circuits are closed and the dotted lines indicate open circuit and one curve is arranged above the other to show that but one of the generating circuits is closed at any given instant.

While the current generated in the coil 18 can be used direct for lighting incandescent electric lamps, I prefer to use it for charging a storage battery from which the lamps receive current, because the presence of the storage battery in circuit with the winding 18 acts as a capacity tending to neutralize the self induction of the generating winding, consequently, the current output of the magneto as a generator charging a storage battery is relatively greater than it would be if it were connected directly to a lamp load.

To those skilled in the art to which my invention relates, many alterations in construction and widely different embodiments and applications of my invention will suggest themselves, without departing from the spirit and scope thereof. My description and disclosures herein are purely illustrative and are not intended to be in any sense limiting. In particular, it should be understood that while one of the objects of my invention has to do with the utilization of a permanent magnet or magnets, and while I have shown permanent magnets rather than electro-magnets in the apparatus illustrated, the invention, with respect to other ends sought, is not to be understood as limited to the use of permanent magnet.

It will be noted that the shaping, arrangement and operation of the inductor rotor is such that the paths of least reluctance which it successively and periodically establishes between the pole pieces are through the sections of the inductor, that is transverse to the axis of the inductor and not lengthwise of the inductor. The parts at 14$^e$, 15 and 14$^f$ are, any one or all of them, in reality closed copper circuits interposed between the flux distributing sections of the inductor and each of them tends to oppose the leakage or passage of flux axially along the inductor from flux distributing section to flux distributing section.

The flux distributing sections of the inductor and the circuit opening and closing mechanism which operates in mechanical synchronism therewith may have their mechanical relationship to each other determined when the parts are assembled, so as to yield the best electrical results in the particular magnetic field structure in which they are to operate.

I have elected to claim in my application Ser. No. 627,927, filed May 18, 1911, certain subject-matter divided out herefrom and relating to the rectangular nature of the field structure, disposition of permanent magnets relative thereto, correlation of the polar faces of the inductor rotor and pole pieces, and arrangement of the ignition generating winding whereby there is alternately established a unidirectional flux path for the flux of all the magnets through said winding and then a path outside of said winding, so that the flux always traverses the said winding in the same direction.

Other features relating to the combined or duplex generator unit, *per se*, are claimed in my divisional application, Serial No. 124,827, filed October 10, 1916.

Furthermore I make no claim in the present application to those features of my improved system which have to do with the peculiar inter-relation of the two generators by virtue of which regulation of the voltage of the work or light circuit and other advantages are secured, the said features being claimed in my said co-pending application Serial No. 124,827.

What I claim is:—

1. The method of utilizing the flux of a permanent magnet in generating and storing electric currents, it consisting in periodically varying the density of the flux of the magnet threading through a generating coil so as to generate in the latter an alternating electro-motive force, periodically connecting the terminals of the coil with the terminals of the storage battery only during the generation of electro-motive force in the winding due to the decrease of magnetic flux density therethrough and when and only when the value of such electro-motive force is equal to or superior to the voltage of the battery and then opening said circuit while the voltage of the generating winding is still equal to or superior to the voltage of the battery.

2. The method of utilizing the flux of a magnetic field in generating and storing electric currents for ignition and other purposes, it consisting in distributing the said magnetic flux alternately through a low tension generating coil and a high tension generating coil having in its circuit a spark gap, so as to generate electro-motive forces in said coils, respectively, differing in phase from each other, and periodically making and maintaining a connection between the terminals of the low tension coil and the terminals of a storage battery only while the electro-motive force generated in the said coil is great enough and in the proper direction to charge the battery, closing the circuit through the high tension coil, and opening the said circuit during generation of electro-motive force in the said coil.

3. A storage battery charging system comprising in combination a source of alternating electro-motive force of an irregularly variable average value, a storage battery, devices adapted to intermittently make and maintain a connection between said source and the terminals of the battery when the electro-motive force generated is in the proper direction to charge the battery, and means for automatically varying the time of such connection between the source of electro-motive force and the terminals of the battery as the average value of the electro-motive force varies, whereby the connection of the source of electro-motive force to the battery terminals is prevented when the electro-motive force is less than the voltage of the battery.

4. An ignition and battery charging system comprising in combination generating apparatus having means for establishing a magnetic field, a low tension generating coil, a high tension generating coil having in its circuit a spark gap, and an armature adapted to distribute the flux of the magnetic field alternately through the low tension generating coil and the high tension generating coil so as to generate electro-motive forces in said coils, respectively, differing in phase from each other, a storage battery, means for intermittently making and maintaining a connection between the terminals of the low tension coil and the terminals of the battery only while the electro-motive force generated in the coil is great enough and in the proper direction to charge the battery, and means for closing the circuit through the high tension coil and for opening the said circuit during generation of electro-motive force in the said coil.

5. An ignition and battery charging system comprising in combination generating apparatus having means for establishing a magnetic field, a generating coil, a second generating coil physically independent of the first named coil and having in its circuit a spark gap, and an armature adapted to distribute the flux of the magnetic field through the said generating coils in alternation so as to generate electro-motive forces in said coils, respectively, differing in phase from each other, a storage battery, means for intermittently making and maintaining a connection between the terminals of the first named generating coil, and the terminals of the battery only, while the electro-motive force generated in said coil is great enough and in the proper direction to charge the battery, and means for closing the circuit through the second named coil and for opening the said circuit during generation of electro-motive force in the said second coil.

6. The method of utilizing the flux of a magnet in generating and storing electric currents for ignition and other purposes, it consisting in distributing the flux of the magnet alternately through one generating coil and a second, physically independent generating coil having in its circuit a spark device, so as to generate electro-motive forces in said coils, respectively, differing in phase from each other, and periodically making and maintaining a connection between the terminals of the first named coil and the terminals of a storage battery only while the electro-motive force generated in the said coil is great enough and in the proper direction to charge the battery, closing the circuit through the second coil, and opening the said circuit during generation of electromotive force in the second coil.

7. A circuit maker and breaker for an alternating current circuit consisting of separable electrodes, means normally tending to press said electrodes into engagement with each other, means for periodically moving one of said electrodes away from the other, a stop adapted to engage said periodically moved electrode to hold it from contact with the other electrode, and means for withdrawing said stop from the path of said movable electrode when the voltage of the circuit to be closed reaches a predetermined value.

8. A circuit maker and breaker for an alternating current source of supply, consisting of a pair of separable electrodes, means normally tending to press said electrodes into contact with each other, a stop for engaging one of said electrodes and holding it from contacting with the other, means for periodically separating said electrodes and moving the one which can engage said stop out of stop-engaging position, and means for withdrawing said stop from the path of said electrode with which it may engage.

9. A circuit maker and breaker for an alternating current source of supply, consisting of a pair of separable electrodes, means normally tending to press said electrodes into contact with each other, a stop for engaging one of said electrodes and holding it from contacting with the other, means for periodically separating said electrodes and moving the one which can engage said stop out of stop-engaging position, and electro-magnetic means for withdrawing said stop from the path of said electrode with which it may engage.

10. In a circuit controlling mechanism, the combination of a pair of separable electrodes, means tending to press the electrodes into engagement with each other, means for intermittently moving one of the electrodes away from the other, means for preventing the engagement of the electrodes when the voltage of the circuit is below a certain value, and means for rendering the last named means inoperative when the voltage of the circuit is equal to or greater than said value.

In testimony whereof I affix my signature, in the presence of two witnesses.

LEON J. LE PONTOIS.

Witnesses:
  RICHARD HARBURGER,
  EDWARD R. ALEXANDER.